3,443,844
SELF-CLEANING TRACK AND DRIVE ASSEMBLY
FOR TRACK-LAYING VEHICLES
Richard H. A. Schoonover, Albany, Oreg., assignor to
Katrak Vehicle Company, Albany, Oreg., a corporation
of Oregon
Filed Aug. 15, 1967, Ser. No. 660,824
Int. Cl. B60s 1/62; B62d 25/16, 55/08
U.S. Cl. 305—13                                    4 Claims

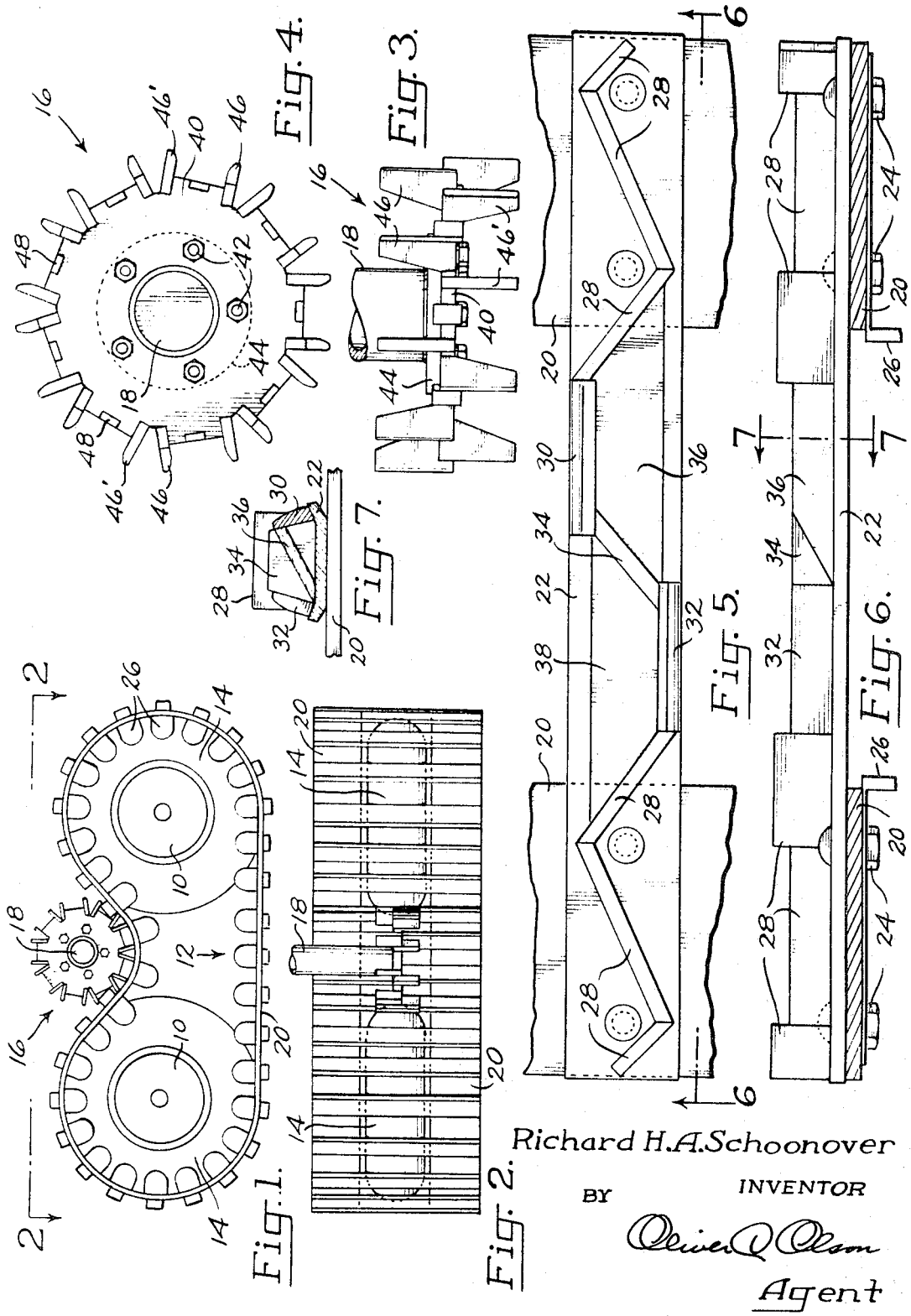
May 13, 1969  R. H. A. SCHOONOVER  3,443,844
SELF-CLEANING TRACK AND DRIVE ASSEMBLY
FOR TRACK-LAYING VEHICLES
Filed Aug. 15, 1967
Richard H.A. Schoonover
INVENTOR
BY
Oliver Q. Olson
Agent

United States Patent Office 3,443,844
Patented May 13, 1969

ABSTRACT OF THE DISCLOSURE

Each of the transverse lugs of a track member has a drive sprocket engaging section which includes an elongated base plate supporting a pair of longitudinally spaced sprocket tooth engaging members projecting outwardly from opposite side edges thereof and interconnected by an angular connecting plate, and an inclined floor plate extending from the outer end of each engaging member toward the opposite edge of the base member. These engaging members are adapted to be engaged by sprocket teeth projecting in opposite directions from a rotary drive sprocket disc member. Debris collected by the track is removed from between adjacent lugs by reverse flexing of the track as it moves around track mounting wheels and around the drive sprocket, and also is removed over the inclined floor plate as the sprocket tooth engages the associated engaging member.

Background of the invention

This invention relates to track-laying vehicles and more particularly to a novel track and drive assembly which is self-cleaning, whereby to insure positive driving under all conditions while minimizing the possibility of damage to the assembly.

Track-laying vehicles heretofore have employed articulated endless track members driven by a rotary sprocket. However, they are susceptible to jamming by rocks, mud and other debris, resulting in slippage of the drive connection and damage to the assembly.

Summary of the invention

Broadly, the present invention provides an endless track formed of a plurality of spaced, interconnected transverse lugs each of which has a sprocket drive engaging section which functions by reverse flexing of the track and by the wiping action of the engaging sprocket teeth to clear the assembly of debris.

It is the principal object of the present invention to overcome the disadvantages of prior track and drive assemblies, as explained hereinbefore, by providing a self-cleaning track and drive assembly of simplified and rugged construction.

Another object of the present invention is to provide a self-cleaning track and drive assembly which is capable of use with pneumatic track-mounting tires.

The foregoing and other objects and advantages of the present invention will appear from the following detailed description, taken in connection with the accompanying drawing of the preferred embodiment.

Brief description of the drawing

FIG. 1 is a view in side elevation of a self-cleaning track and drive assembly embodying the features of the present invention.

FIG. 2 is a fragmentary plan view as viewed from line 2—2 in FIG. 1.

FIG. 3 is a fragmentary plan view of the drive sprocket.

FIG. 4 is a side elevation of the drive sprocket.

FIG. 5 is a fragmentary plan view of the track showing details of construction of the lug member.

FIG. 6 is a sectional view taken on the line 6—6 in FIG. 5.

FIG. 7 is a fragmentary sectional view taken on the line 7—7 in FIG. 6.

Description of the preferred embodiment

In FIGS. 1 and 2 of the drawing there is shown a track-laying assembly which includes a pair of longitudinally spaced track mounting wheels 10 mounting an endless track member 12. In the embodiment illustrated, the track mounting wheels include pneumatic tires 14. Interposed between the pair of wheels is a driven sprocket wheel 16 secured to a rotary driven shaft 18 and arranged to engage driving members on the track.

The endless track member includes a pair of laterally spaced, endless, flexible belt members 20 which are interconnected by a plurality of longitudinally spaced, transverse bars 22, as by means of the bolts 24. Projecting inward from each bar is a pair of laterally spaced guide plates 26 dimensioned to receive between them the pneumatic tires 14 of the track mounting wheels. The endless track member thus is maintained in proper position on the mounting wheels.

Each bar 22 forms the base plate of a lug member which is provided with ground engaging cleat members 28 projecting outwardly from the opposite end portions thereof.

In accordance with the present invention each lug member is provided with a drive-engaging section intermediate the cleats 28. This section comprises a pair of longitudinally spaced sprocket tooth engaging members 30 and 32 projecting outwardly from the opposite side edges of the base plate 22 and preferably inclined slightly toward the longitudinal centerline of the base plate (FIG. 7). A connecting plate 34 extends angularly across the base plate and interconnects the sprocket engaging members at their adjacent ends. Inclined floor plates 36 and 38 extend from the outer ends of the sprocket engaging members 30 and 32, respectively, toward the opposite edges of the base plate 22.

The rotary drive sprocket 16 adapted for use with the endless track member described hereinbefore is best illustrated in FIGS. 3 and 4 of the drawing. The sprocket includes a disc member 40 adapted to be secured to the rotary driven shaft 18 by such means as the mounting bolts 42 and shaft hub 44. A plurality of sprocket teeth are secured to the circumference of the disc member, in circumferentially spaced relation, and project alternately to opposite sides of the disc member. The teeth 46 extending to one side of the disc member are adapted to engage the outer side of the engaging members 30 or 32 on one side of the lug members for driving the vehicle in one direction, and the teeth 46' extending to the opposite side of the disc member are adopted to engage the outer side of the engaging members 32 or 30 on the opposite side of the lug members to drive the vehicle in the opposite direction. Between the adjacent pair of sprocket teeth associated with one of the lug members is a notch 48 adapted to receive the connecting plate which joins the engaging members.

The self-cleaning operation of the track and drive assembly described hereinbefore is as follows: As the track laying vehicle moves over the ground, the ground engaging stretch of the track picks up rocks, sticks, mud and other debris. Some of the debris passes through the open spaces between lugs as the track moves about the trailing track-mounting pneumatic tire 14. As the track bends in the reverse direction under the drive sprocket 16, additional debris is caused to pass through said openings between lugs. Further, as each sprocket tooth comes into engagement with one of the engaging members 30, 32 of the drive engaging section, it forces debris through the space between said lug member and the next trailing lug member, and forces additional debris forwardly down the associated one of the inclined floor plates 36, 38. In this manner positive driving engagement between the drive sprocket and drive engaging sections of the track member is maintained, and the track member is kept free of debris which otherwise might cause jamming and damage to the assembly.

Still further, as the track bends in the reverse direction under the drive sprocket 16 the outwardly projecting members 30, 32 are moved closer to each other, constricting the space between adjacent members. Accordingly, the sprocket teeth 46, 46' are locked effectively to the track, whereby the track is not pushed away and out of engagement with the sprocket teeth.

It will be apparent to those skilled in the art that various changes in the size, shape and arrangement of parts described hereinbefore may be made.

Having now described my invention and the manner in which the same may be used, what I claim as new and desire to secure by Letters Patent is:

1. A self-cleaning track and drive assembly for track-laying vehicles, comprising
   (a) a rotary drive sprocket including a disc member,
   (b) sprocket teeth on the disc member spaced apart circumferentially thereon and projecting alternately in opposite directions therefrom,
   (c) longitudinally spaced track-mounting wheels supporting the endless belt, said drive sprocket mounted to engage the outer surface of said belt, and
   (d) a plurality of longitudinally spaced transverse lug members joined together as an endless belt,
   (e) each lug member having a drive-engaging section including
      (1) an elongated base plate,
      (2) a pair of longitudinally spaced sprocket tooth engaging members projecting from the opposite side edges of the base plate,
      (3) a connecting plate extending angularly across the base plate and interconnecting the sprocket engaging members, and
      (4) an inclined floor plate extending from the outer end of each sprocket engaging member toward the opposite edge of the base plate,
      (5) the side of each sprocket engaging member opposite the associated floor plate being adapted for driving engagement by a tooth of the drive sprocket.

2. The assembly of claim 1 wherein the side of each sprocket engaging member opposite the associated floor plate is inclined toward the longitudinal center line of the base plate.

3. The assembly of claim 1 including a pair of laterally spaced endless belt members, the transverse lug members being secured to and spanning the belt members on the outer sides thereof.

4. The assembly of claim 1 wherein the track mounting wheels include pneumatic tires, and laterally spaced guide plate members project inwardly from each lug member for confining the pneumatic tires between them.

References Cited

UNITED STATES PATENTS

| 1,574,042 | 2/1926  | Bager      | 305—11   |
| 1,705,980 | 3/1929  | Knox       | 305—20 X |
| 2,599,233 | 6/1952  | Christie   | 305—11   |
| 3,347,601 | 10/1967 | Bombardier | 305—35   |

RICHARD J. JOHNSON, *Primary Examiner.*

U.S. Cl. X.R.

180—9.62; 305—20, 35, 57